(12) United States Patent
Yang

(10) Patent No.: US 7,643,105 B2
(45) Date of Patent: Jan. 5, 2010

(54) DISPLAY SYSTEM ON REFLECTIVE INTERACTION GUIDED BY A LIGHT SOURCE

(76) Inventor: Tai-Her Yang, No. 59, Chung Hsing 8 St., Si-Hu Town, Dzan Hwa (TW)

( * ) Notice: Subject to any disclaimer, the term of this patent is extended or adjusted under 35 U.S.C. 154(b) by 604 days.

(21) Appl. No.: 11/088,854

(22) Filed: Mar. 25, 2005

(65) Prior Publication Data

US 2007/0165155 A1    Jul. 19, 2007

(51) Int. Cl.
*G02F 1/1335* (2006.01)
(52) U.S. Cl. .......................... 349/62; 349/63; 349/113; 349/114; 362/559; 362/561; 362/554
(58) Field of Classification Search .................. 40/612; 362/554, 556, 559–561
See application file for complete search history.

(56) References Cited

U.S. PATENT DOCUMENTS

| | | | | |
|---|---|---|---|---|
| 6,151,821 A | * | 11/2000 | Nakajima | 40/612 |
| 6,266,108 B1 | * | 7/2001 | Bao et al. | 349/63 |
| 6,369,866 B1 | * | 4/2002 | Rai et al. | 349/61 |
| 6,895,145 B2 | * | 5/2005 | Ho | 385/35 |
| 2004/0257503 A1 | * | 12/2004 | Yamazaki | 349/113 |

* cited by examiner

*Primary Examiner*—Richard H Kim
(74) *Attorney, Agent, or Firm*—Rabin & Berdo, P.C.

(57) ABSTRACT

The present invention is to provide a system that displays interactive messages by light emission of preset response depending on the direction of the light from indefinite light source; a light collecting device is used to collect the incidental light from an indefinite light source into clustered beam with higher luminance to be projected into one end of a light guide device before being projected in one direction or multi directions from another end of the light guide device, or light emitted display of selected text or graphics.

13 Claims, 2 Drawing Sheets

DISPLAY SYSTEM ON REFLECTIVE INTERACTION GUIDED BY A LIGHT SOURCE

BACKGROUND OF THE INVENTION (a) Field of the Invention

The present invention is related to a display system, and more particularly to one that intensifies the luminance from optical energy of incidental light and reflects the text or graphic response for display.

(b) Description of the Prior Art

The conventional reflective display device, e.g., a reflective sign, usually displays by reflecting the incidental light from indefinite light source by a coated surface or a surface that reflects geometric shape.

SUMMARY OF THE INVENTION

Whereas the conventional reflective display device, e.g., a reflective sign, usually displays by reflecting the incidental light from indefinite light source by a coated surface or a surface that reflects geometric shape; the primary purpose of the present invention is to provide a system that displays interactive messages by light emission of preset response depending on the direction of the light from indefinite light source. To achieve the purpose, a light collecting device is used to collect the incidental light from an indefinite light source into clustered beam with higher luminance to be projected into one end of a light guide device before being projected in one direction or multi directions from another end of the light guide device, or light emitted display of selected text or graphics.

DETAILED DESCRIPTION OF THE PREFERRED EMBODIMENTS

The present invention relates to a display system working on a light collecting device to collect the incidental light from an indefinite light source and cluster the light into beam before being projected into one end of a light guide device for being projected from another end of the light guide device in one direction or multiple directions, or for light emitted display of selected text or graphics for the purpose of light emitted display of interactive messages by a preset response for the direction of the light from an indefinite source.

Figure 1:
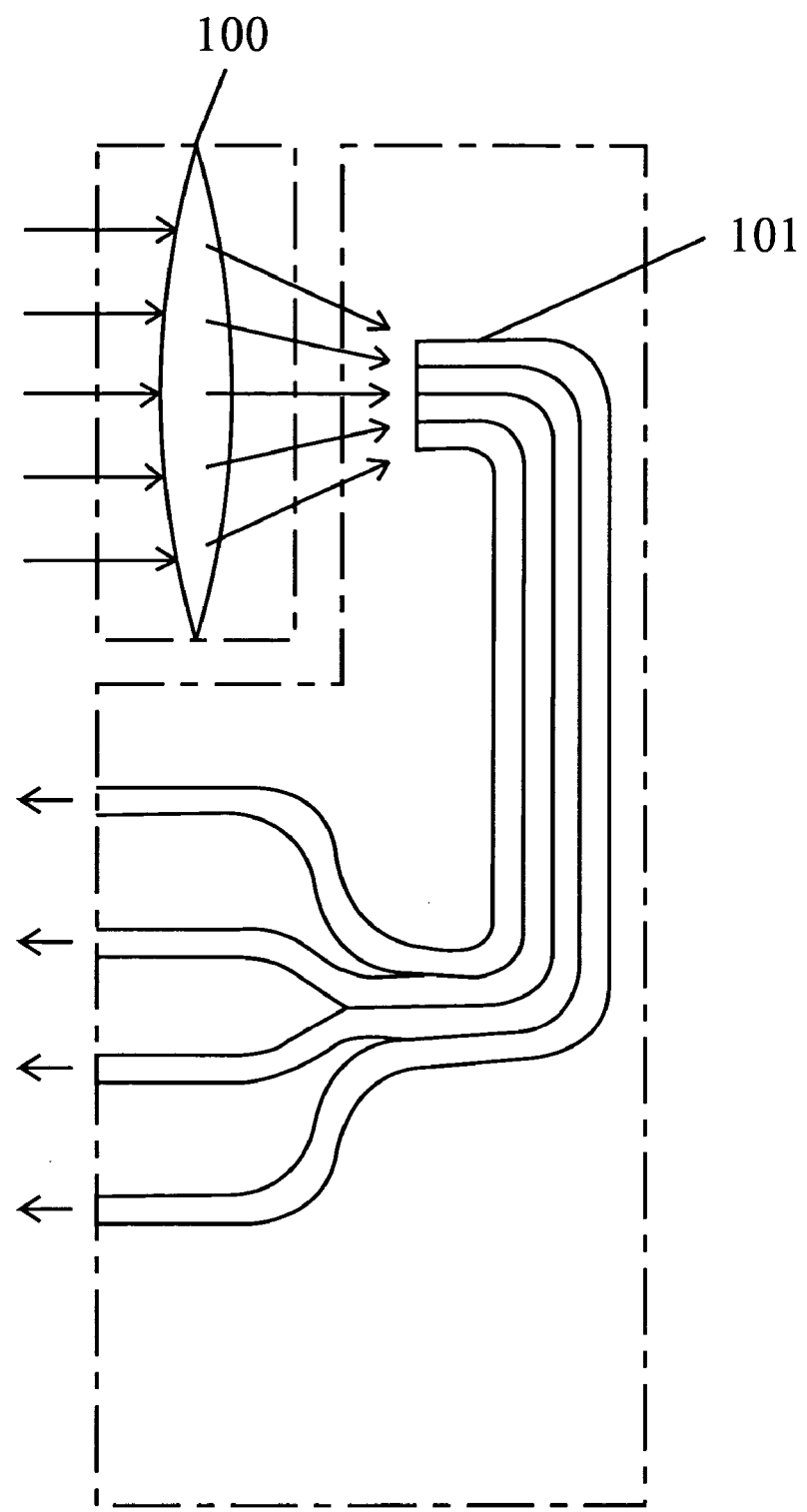
FIG. 1 is a block chart of a system for reflective interaction display by guiding the light from an indefinite light source of the present invention.

FIG. 1 shows a block chart of a system for reflective interaction display by guiding the light from an indefinite light source of the present invention. Other than the structure needed for suspension or fixation, the present invention is essentially comprised of:

Light collection device 100: relates to a set or a multiple sets of focusing lens or concave reflection mirror that is capable of receiving incidental light from one or multiple direction collects and intensify the incidental light emitted in a selected direction from an indefinite light source, then projects the light to one end of a light guide device 101 before being projected from another end of the light guide device 101 in one or multiple direction, or light emitted display of a selected text or graphic is created to emit the light in the direction of the indefinite light source for providing the light emitted interactive messages in the direction of the source of the incidental light; and Light guide device 101: comprised of reflective mirror or light guide fiber having its input end provided with the light collection device 100 to receive beam focused, intensified and outputted from the incidental light of the indefinite source; the beam for projection in one or multiple direction or light emitted display of selected text or graphic is generated from the output end of the light guide device 101 to emit the light in the direction of the source of the incidental light for achieving purpose of emitted display of interactive messages with preset response in the direction of the source of the incidental light.

The display system working on reflective interaction by guiding the incidental light from the indefinite source may be provided with one or multiple light collection device 100 in one or multiple direction as elected to receive the light from the indefinite source, and the light emitted display may be of the same text or graphic or different texts or graphics outputted from the light guide device 101.

As required, the display system of the present invention may provide continuous variations of the location or angle projected to the light collection device 100 in relative motion by means of the incidental plane of the light from the indefinite source in motion. Meanwhile in relation to the setup of the light guide device 101 for the relative light projection location or angle from the light of the indefinite source in the preset direction, the output end of the light guide device 101 provides continuous light emitted display of the programmed identical or different text or graphic to emit the light in the direction of the light from the indefinite source for achieving the light emitted display of interaction messages based on preset response in the direction of the incidental light from the indefinite source.

Figure 2:
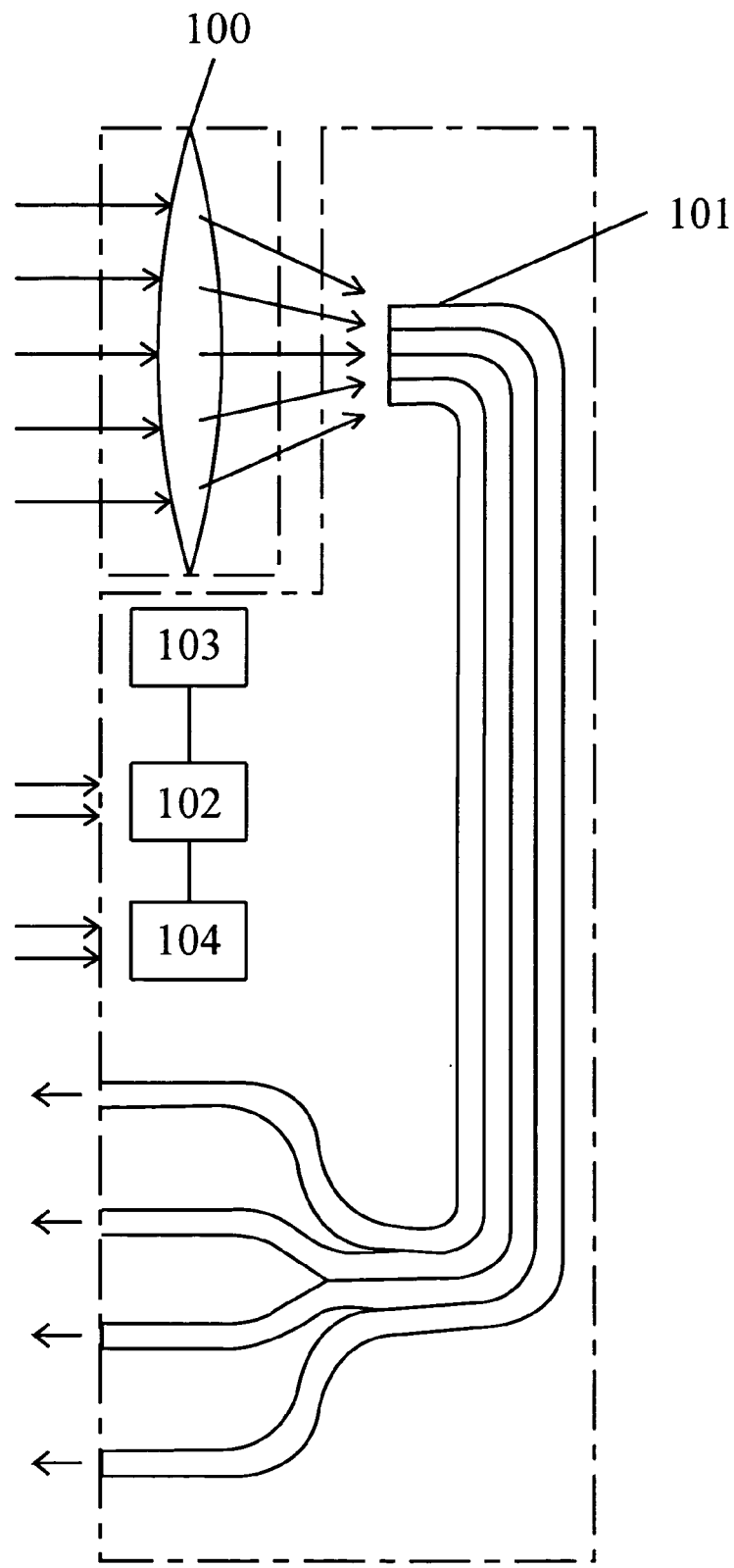
FIG. 2 is a block chart showing the structure and circuitry of the present invention operating in conjunction with a display system that converts electric energy into optical energy.

As illustrated in FIG. 2 for a block chart showing the structure and circuitry of the present invention operating in conjunction with a display system that converts electric energy into optical energy, the present invention may be of a construction of mixed application. Wherein, a solar energy power generation system, or a power generation system working on wind velocity, or a city power source that converts optical energy into electric energy is adapted together with an optional auxiliary power source device 104 comprised of a power storage device to the system of the present invention to provide all or any part of the following auxiliary functions:

(1) The display system working on guiding the light from the indefinite source to provide reflective interaction is further incorporated with an optical control functional circuit device 102 and an auxiliary power source device 104 so to provide electric power to drive the auxiliary display device 103 that converts electric energy into optical energy to provide the light emitted display by receiving the incidental light from the indefinite source in a given direction when the ambient luminance is lower than a preset luminance. The auxiliary display device 103 is in a status of power interruption when the ambient luminance is higher than the preset luminance, that is, even the ambient luminance is higher than the preset luminance, the light reception will not provide light emitted display of reflective interaction with the light from the indefinite source in a preset direction. When the ambient luminance is lower than the preset luminance and the incidental light from the indefinite source in a preset direction is received, the auxiliary display device 103 that converts electric energy into optical energy is operated and controlled to provide continuous light emitted display or a light emitted display of text or graphic is provided by the auxiliary display device 103 driven by the incidental light that converts electric energy to optical energy; or (2) An optional function of the operation and control for a time delayed power interruption may be provided as required for the light collection device 100 to collect and intensify the incidental device, and further to output through the light guide device 101 the preset interaction messages of light emitted text, graphic or other light emitted display for achieving the purpose of providing interactive function in the direction of the source of the incidental light; or (3) A circuitry device 102 providing optical control function as activated by the incidental light is provided to operate and control the electric energy from the auxiliary power source 104 to drive the text, graphic or other light emitted device that converts electric energy into optical energy for achieving the interactive messages in the direction of the source of the incidental light; or (4) An auxiliary power source device 104 comprised of a power storage device incorporated with a solar energy power generation device that converts optical energy into electric energy is provided to convert the incidental light into electric energy to be charged into the power storage device so to drive the light emitting device that converts electric energy into optical energy for projecting the beam, or to input the beam into the light guide device 101 to produce projection beam in one or multiple direction, or produce the light emitted display of selected text or graphic, thus to send light emitted display of interactive messages based on preset response with the incidental light emitted in the direction of the indefinite light source.

In general, the display system of the present invention that executes reflective interaction by guiding the light from the indefinite source operating on a light collection device to collect and intensify the incidental light to generate the light emitted text and graphic from the output end of the light guide device for providing the display function of interaction in the direction of the source of the incidental light to be applied in the road sign, adapted to a carrier or other reflective warning purpose, or in the light emission display device of other multi-media AD or decoration to achieve better results and higher luminance than the direct reflection by the conventional display is innovative; therefore, this application is duly filed accordingly.

The invention claimed is:

1. A display device for showing a pattern using incoming light from a direction, comprising:
   a light collecting device configured to collect and intensify the incoming light;
   a light guide device configured to transmit the incoming light from a first end of the light guide device to a second end, wherein both the first and second ends face the direction, the first end receives light from the light collecting device, and the second end displays the pattern;
   a control circuit, and an auxiliary device with a powered light source, wherein the auxiliary device, as controlled by the control device, starts to provide light when the incoming light is dim, and stops providing light when the incoming light is bright; and
   an optical conversion device for converting the incoming light into energy and storing the energy in a power storage device.

2. The display device of claim 1, wherein the auxiliary device converts the energy stored in the power storage device to provide light when the incoming light is dim.

3. The display device of claim 1, further comprising a wind power generation device for converting wind energy into power to charge the power storage device.

4. The display device of claim 1, further comprising a city power source for supplying power to charge the power storage device.

5. The display device of claim 1, wherein the device is a road sign.

6. The display device of claim 1, wherein the pattern includes text.

7. The display device of claim 1, wherein the light guide device includes optical fibres.

8. The display device of claim 7, wherein the optical fibres converge and intensify the incoming light to produce bright light.

9. The display device of claim 1, wherein the light guide device includes a mirror.

10. The display device of claim 1, wherein the incoming light is from the second end of the light guide device.

11. The display device of claim 1, wherein the light collecting device includes a convex lens.

12. The display device of claim 1, wherein the light collecting device includes at least one set of focusing lenses.

13. The display device of claim 1, wherein the light collecting device includes at least one set of concave mirrors.

* * * * *

UNITED STATES PATENT AND TRADEMARK OFFICE
CERTIFICATE OF CORRECTION

PATENT NO. : 7,643,105 B2 Page 1 of 1
APPLICATION NO. : 11/088854
DATED : January 5, 2010
INVENTOR(S) : Tai-Her Yang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1255 days.

Signed and Sealed this

Sixteenth Day of November, 2010

David J. Kappos
*Director of the United States Patent and Trademark Office*